Jan. 12, 1954
C. MARQUAIRE
2,665,981
METALLIC POWDERS
Filed May 18, 1951
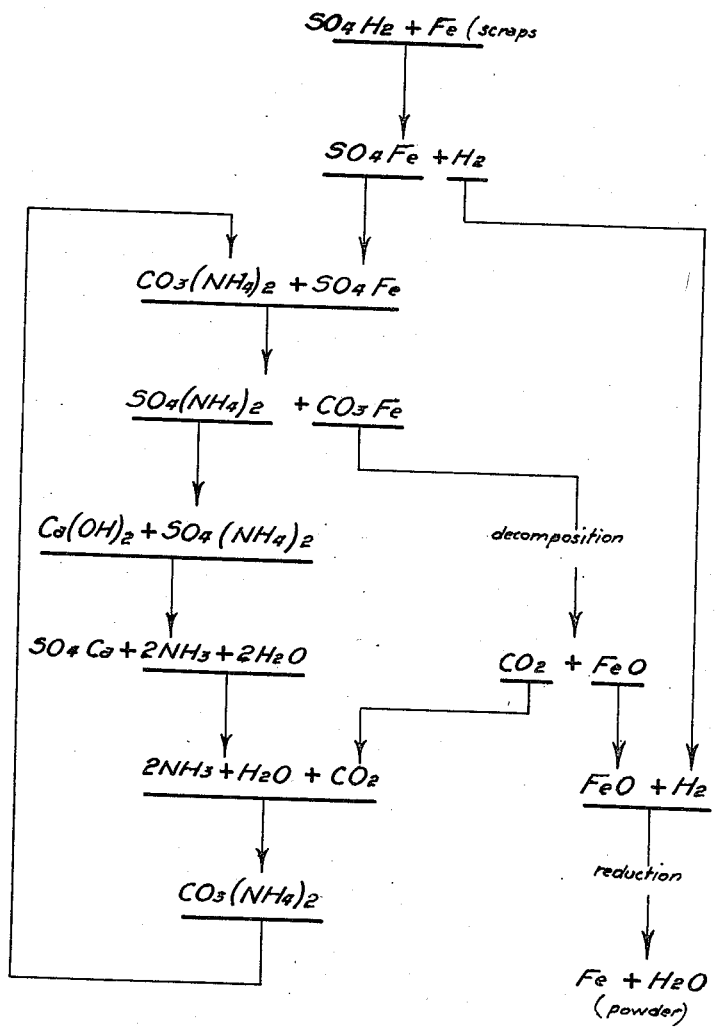
Inventor
Charles Marquaire
by
Will, Manley & Burden.
Attys.

Patented Jan. 12, 1954

2,665,981

UNITED STATES PATENT OFFICE 2,665,981

METALLIC POWDERS

Charles Marquaire, La Tronche, France, assignor to Societe d'Electro-Chimie d'Electro-Metallurgie et des Acieries Electriques d'Ugine, Paris, France, a corporation of France Application May 18, 1951, Serial No. 227,090

Claims priority, application France May 22, 1950

4 Claims. (Cl. 75—0.5)

A great number of methods are known for the manufacture of metallic powders and especially of iron powders. Thus, it is known to manufacture said powders by grinding, by electrolysis, by atomization of liquid metals, by volatilization of metals, by reduction of oxides or metallic compounds or other similar methods.

As the applications of the powders grow considerably in industrial development, the specific properties of said powders must be more and more defined as a function of the uses which are desired for the same.

It is known to manufacture metallic powders for the preparation of permanent magnets with very high magnetic characteristics, more particularly by a method which consists in making permanent magnets by agglomeration, by way of simple compression of powder obtained by reduction under suitable conditions of metallic formates, oxalates, hydroxides and carbonates. Such powders show the remarkable property of possessing an exceedingly high coercive force which is maintained after the compression and owing to which the obtained magnets show very high magnetic characteristics.

A method has also been developed for the preparation from formates of an iron powder making it possible by a simple agglomeration to manufacture compact and coherent pieces. The iron powder obtained by this method possesses no characteristics which make it suitable for the manufacture of permanent magnets but, on the other hand, it is particularly well suited for the manufacture of iron articles by simple compression. However, this method is comparatively expensive owing to the high price of formic acid. Furthermore, the obtained powder always shows an appreciable carbon content.

The present invention has for its object to provide for the manufacture of metallic powders and especially iron powders which are particularly pure and suited for the manufacture of metallic articles by a simple compression in the cold without sintering or with a sintering effected at a lower temperature and more rapidly than in the case of the hitherto used powders.

The powders obtained by the method in accordance with the present invention show a very small coercive force which excludes their use for the manufacture of permanent magnets but makes them, on the other hand, particularly well suited for the manufacture of articles which are to show a high magnetic permeability.

The method in accordance with the invention resorts to the decomposition and to the reduction of the carbonates but this decomposition and this reduction are performed, as indicated hereafter, under particular conditions which are such that the obtained final product is endowed with properties which distinguish it from the prior products resulting from the decomposition of carbonates under other conditions and, more particularly, as stated more precisely hereinabove, it practically possesses no coercive force.

This methodl constitutes, furthermore, a new and particularly economical method for the obtention of powders. It essentially comprises a series of chemical reactions which consist in attacking the metal or metals which it is desired to obtain in the state of powders with an acidic solution causing an escape of hydrogen and bringing forth the formation of a solution of the corresponding salt, in forming the carbonate of this metal or metals by the action of ammonium carbonate on said solution with formation of a solution of the ammonium salt of the acid which is used, in decomposing said carbonates into oxides and carbonic gas, in reducing the so formed oxides by hydrogen at a temperature higher than 500° C. whereafter one preferably proceeds to the regeneration of the ammonium carbonate by the action of lime on the ammonium salt which gives rise to formation of ammonia on which carbonic gas and water are caused to act.

In order that the invention may be better understood the series of the reactions which occur in the particularly interesting case of the production of an iron powder from scrap iron and sulphuric acid is given hereunder by way of example:

(1) The iron is attacked in the form, for example, of rather fine divided scraps by a diluted solution of sulphuric acid. The hydrogen which escapes in the course of the operation is collected in a gas-holder, possibly after purification, and kept with a view to using it in a later step of the method which will be disclosed hereafter.

The attack is carried out in the presence of an excess of iron in order to use up almost totally the acid which is employed. The reaction which is exothermic requires only a small supply of heat. The initial concentration of the acid is chosen in such a manner that, after the reaction, a solution of ferrous sulphate in the neighborhood of the saturation and a concentration of free residual acid of about 1% are obtained. For example, one may start with a 25% solution of sulphuric acid and end with a slightly acid ferrous sulphate solution saturated to 60%.

(2) The ferrous sulphate solution is filtered and mixed under shelter from air with an ammonium carbonate solution saturated with carbonic gas by bubbling of said gas at atmospheric pressure and at a temperature round 50° C. The reaction for the formation of the iron carbonate which is aided by the stirring produced by the bubbling is immediate and the iron carbonate precipitates. The ammonium sulphate solution resulting from reaction is removed and the carbonate precipitate is washed preferably with hot water saturated with carbonic gas. This precipitate is then again dried under shelter from air. A particularly convenient means for performing this drying consists in atomizing in an atmosphere of hot carbonic gas the sludge formed by said precipitate.

(3) One proceeds to the decomposition of the so obtained iron carbonate by heat which gives rise to the formation of ferrous oxide and to an escape of carbonic gas. This decomposition is preferably performed at a low temperature, for example in the neighbourhood of 350° C. by removing as rapidly as possible from the reaction field the carbonic gas which settles as it appears either through a fall of the pressure or through carrying forth by means of a neutral or reducing gas. It is recommended to collect the carbonic gas which escapes in the course of said decomposition in order to use it in a later step of the method.

(4) The reduction of the ferrous oxide by hydrogen is then performed at a temperature of more than 500° C. by using, for example, the hydrogen produced by the initial attack of the iron by sulphuric acid. Said attack yields the necessary quantity of hydrogen except for losses.

The reduction temperature and the hydrogen output must be chosen while observing the following considerations according to the properties which are to be conferred to the powder:

(a) The apparent density of the powder is the smaller the lower the reduction temperature. However, this latter must never fall below 500° C. since otherwise one would obtain a comparatively impure pyrophoric powder endowed with a high coercive force.

(b) If the reduction temperature increases the purity of the iron increases whilst its fineness decreases as well as its grinding facility.

(c) For a predetermined reduction temperature a powder is obtained which is the purer, in a given time, the higher the hydrogen output without substantially changing its apparent density. In any case it is of interest to work with previously purified and very well dried hydrogen.

A high output and a high drying of the hydrogen make is possible to reduce the duration of the treatment or to reduce the temperature of said treatment.

It is possible to carry out the method by directly reducing the carbonate by hydrogen while taking care to provide a temperature level at about 350-450° C. under a very small hydrogen output during a predetermined period of time which is sufficient in order to obtain the total decomposition of the iron carbonate. After this level one establishes the normal working temperature and the normal hydrogen output for the reduction. This modification of the method of manufacture makes the recovery of the $CO_2$ a little more difficult but it simplifies the handling of the powder.

On the other hand, it is desirable to apply the known method of reduction in two steps while proceeding to a first at about 600-650° C. in the course of which the iron is almost totally reduced and which leads to the obtention of a fine very friable powder which is crushed, screened and then submitted to a second reduction at a temperature chosen according to the desired oxygen content and fineness.

This method makes it possible to obtain a fine non-sintered powder at the outlet of the reduction oven.

(5) It is possible to treat with lime the ammonium sulphate solution obtained in the second step of the method which gives rise to an escape of ammonia which is collected in solution in water.

(6) The carbonic gas produced in the third step of the method is caused to pass into this latter solution in order to obtain the ammonium carbonate solution saturated with carbonic gas which is necessary in the second step.

It is to be noted that in the steps 5 and 6 the recovered ammonia correspond except for losses to the quantity which is necessary for the precipitation of the iron carbonate in the second step of the method.

The accompanying drawing shows the whole of the reactions which are used in the above described method while taking into account the possible recoveries and which may be summed up in the following manner:

(1) $SO_4H_2 + Fe$ (scraps) $\longrightarrow SO_4Fe + H_2$
(2) $SO_4Fe + CO_3(NH_4)_2 \longrightarrow CO_3Fe + SO_4(NH_4)_2$
(3) $CO_3Fe \longrightarrow FeO + CO_2$
(4) $FeO + H_2 \longrightarrow Fe + H_2O$
(5) $SO_4(NH_4)_2 + Ca(OH)_2 \longrightarrow SO_4Ca + 2NH_3 + 2H_2O$
(6) $CO_2 + 2NH_3 + H_2O \longrightarrow CO_3(NH_4)_2$ This series of operations could be performed under quite similar conditions with hydrochloric acid instead of sulphuric acid. The method would be less economical but the obtained powder would be purer and, more particularly, entirely free from sulphur without, however, containing chlorine, owing to the facility of removal of the ammonium chloride by washing and to its volatility in the reduction step.

In a general way, other acids and other metals than iron may also be used, provided the action of the acid on the metal liberates hydrogen with formation of a soluble salt which may be converted into a carbonate by the action of ammonium carbonate.

When applied to the preparation of iron powder the method in accordance with the invention conduces to the obtention of a powder the main properties of which are: a very high purity, a very small apparent density, a remarkable fitness for agglomeration by a simple compression in the cold and a high fineness.

It is known that in the preparation of the powders in a chemical way the manner in which the starting compound is prepared exerts a considerable influence on the properties of the obtained powders. More precisely, in the manufacturing method in accordance with the invention it is the preparation of the carbonate as it is indicated above which conduces both to a particularly low cost of the powder and to the properties which were just mentioned and on which the following precisions may be given for a powder made by means of sulphuric acid:

I. *Purity*

The obtained powder is practically free from sulphur, phosphorus, silicon and carbon. On the contrary, the manganese content is equal to that of the starting iron scraps. But if iron scraps with a very low manganese content are used it is possible to obtain a powder the purity of which is comparable with that of the electrolytic iron or of the iron obtained by the decomposition of carbonyl iron.

Manganese is present in the powder in the form of oxide and any reduction in the manganese content reduces the oxygen content accordingly and meliorates the properties of the powder.

For example, when starting from soft iron scraps of the following analysis:

Mn=0.28%
Si=0.08%
S=0.05%
P=0.1%
C=0.1% it is possible to obtain, while working with hydrochloric acid, a powder the impurity contents of which are the following:

| Body | Mode of reduction | |
|---|---|---|
| | A single reduction at 600° C. | 2 reductions, first at 600° C., then at 750° C. |
| Mn | 0.27 | 0.27 |
| Si | <0.005 | <0.005 |
| S | <0.002 | <0.002 |
| P | 0.02 | 0.02 |
| C | 0.008 | <0.005 |
| O₂ | 0.35 | 0.20 |

The iron powder obtained by decomposition of formate is much less pure; when reduced at 600° C. it contains 0.50% of $O_2$ and 0.15% of C; when reduced at 750° C. it still contains 0.30% of $O_2$ and 0.03% of C. Its sulphur, phosphorus and silicon contents are clearly higher than those of the iron obtained in accordance with the present invention precisely owing to the preparation of the iron formate through crystallization.

If the powder obtained in accordance with the invention is compared with two iron powders which are on the market and used on a very large scale, viz.: the powder reduced from sponge-iron and the powder obtained by atomization, it will be found that, on the one hand, the powder reduced from sponge-iron is much less pure owing to the difficulty of the mechanical purification of the ore, its silicon content being more particularly very high and, on the other hand, the iron powder obtained by atomization shows the same impurities as the starting metal, this method being such that it does not purify the powder.

The following table indicates by way of comparison the current impurity contents of both said powders in the commercial state:

| Element, percent | C | O | Mn | S | P | SiO₂ |
|---|---|---|---|---|---|---|
| Iron sponge | 0.05 | 1.7 | 0.06 | 0.005 | 0.01 | 1.5 |
| Atomized iron | 0.1 | 0.8 | 0.25 | 0.04 | 0.09 | 0.20 |

II. Geometrical properties of the powder

After reduction one generally obtains for reduction temperatures which do not exceed 800° C. a powder agglomerated into a sponge which is very porous (apparent density about 0.7) which may easily be crushed to powder with a device such as, for example, a cylinder grinding machine.

The reduction temperatures are much lower than those which are necessary for the other methods. This lowering is due to the condition of the iron which appears in the ferrous state owing to the decomposition of the iron carbonate in a non-oxidizing atmosphere.

The characteristics of this powder are: the fineness of the grain, the very irregular shape and the porous structure of the grain as well as the very small apparent density of the powder.

COMPARATIVE TABLE

| Mode of obtention of the powder | Grain size microns | Specific surface cm.²/g. | Apparent density non-packed g./cm.³ | Apparent density packed g./cm.³ |
|---|---|---|---|---|
| From carbonate with reduction at 600° C. | 1–5 | 11,000 | 1.1 | 1.35 |
| From carbonate with reduction at 600° C. and then at 750° C. | 2–10 | 4,500 | 1.5 | 2.0 |
| Through reduction of technical oxide | <50 | 1,000 | 1.6 | 1.85 |
| Through electrolytic method (fine powder) | <50 | 600 | 2.7 | 4.15 |
| From carbonyl iron | 1–5 | 4,000 | 3.5 | 4.35 |
| Sponge-iron | <50 | About 1,000 | 2.9 | 4.7 |

The powders in accordance with the invention are characterized by a small apparent density and a large surface of the particles which are the causes of the strength of the agglomerates and of the sintering facility of the powders of which they are formed.

III. Compressibility and properties of the agglomerates

The compressibility of the powder obtained in accordance with the invention is very good for a powder with such a small apparent density. But the most important characteristic is the high strength of the agglomerates; for a given density this strength is from 50 to 100% higher than that of agglomerates obtained with any other known iron powder.

For example, the powder obtained in accordance with the invention by reduction at 600° C. supplies, when compressed under 6 T/cm.² an agglomerate having a density $(d)$ of 6.25 the tensile strength of which (R) is 10 kgs./mm.² and the Brinell hardness is 110. Under 11 T/cm.² the corresponding characteristics are:

$$d=6.7 \quad R=14 \text{ kgs./mm.}^2 \quad \Delta_B=120$$

For a powder reduced at a higher temperature the characteristics are a little poorer; the density is higher, but the strength is smaller for an equal density or even for an equal compression.

The advantageous mechanical qualities of the agglomerates of powders obtained in accordance with the invention make it possible to use these powders for making pole pieces or magnetic circuits by a simple compression in the cold without subsequent sintering. The magnetic characteristics are very acceptable for certain uses as, for example, in magnetic circuits with a flux of a constant direction.

Thus, an agglomerate obtained by compression under 8 T/cm.² of a powder reduced at 600° C. and having a density of 6.4 has a tensile strength of 12 kgs./mm.², a Brinell hardness of 115, a coercive field of 15 oersteds and a sufficient permeability for obtaining an induction of 10,000 gauss in a field of 150 oersteds. The permeability is meliorated by using a powder reduced at a higher temperature and by agglomerating under a higher pressure.

All these preceding properties cannot be found in any other known powder.

When considering only the fine powders, for the others are much poorer, as regards the strength of the agglomerate, it may be seen that: The powders reduced from technical oxide or sponge-iron yield agglomerates having a much lower strength: for example, the exceptionally pure and fine sponge-iron powder ($<50\mu$) when compressed under 8 T/cm.$^2$ gives an agglomerate having magnetic characteristics which are comparable with those of the powder obtained in accordance with the invention but the strength of which is lower (8 kgs./mm.$^2$ for a density of 6.8).

The same is true for the iron powder obtained by decomposition of carbonyl iron which in the compressed state shows magnetic properties which are a little poorer and above all a poor strength ($R=4$ kgs./mm.$^2$ for a density of 6.6 obtained under 8 T/cm.$^2$).

The iron powder obtained from formate gives agglomerates having a good strength but owing to the fact that its purity is not so high the magnetic characteristics are lower.

It is to be noted, furthermore, that the powders obtained in accordance with the invention may be compressed in the presence of a binding agent in order to give the agglomerate certain particular properties such as, for example, a higher electric resistivity.

IV. Sintering of the agglomerates and properties of the sintered pieces

The essential characteristic of the powders obtained in accordance with the invention is their remarkable fitness for sintering at a low temperature owing to their purity, to their fineness and to the very activated structure of the large surface of their particles.

These conditions render possible a sintering at a comparatively low temperature which in any case is lower than the conversion point ($\alpha,\gamma$) of pure iron. For sintering temperatures below 1200° C., the maximum density and hardness are obtained at a sintering temperature of 850–875° C.

Thus, a powder such as the previously described one when reduced at 600° C., containing 0.4% of oxygen and compressed under 7 T/cm.$^2$ gives an agglomerate having a density of 6.3; when sintered for one hour at 850° C. in hydrogen this agglomerate gives a sintered piece having a density of 7.2 and a tensile strength of 25 kgs./mm.$^2$ and a Brinell hardness of 90 whereas under the same conditions no known iron powder gives a higher strength than 18 kgs./mm.$^2$.

The sintering of an agglomerate which is identical with the preceding one at a higher temperature (1000–1100° C.) gives a piece the strength of which is slightly lower.

Among the other known iron powders only the very fine powders formed from pure oxides can give comparable results but only for the characteristics of sintered pieces.

The crushed, atomized or electrolytic current commercial powders yield the values of the preceding characteristics only after a sintering at a higher temperature, which is higher than 1200° C.

V. Price

On the base of a plant capable of producing from 10 to 20 tons of powder per month the cost of an iron powder obtained in accordance with the invention is comparable with that of the coarse iron powders (sponge-iron, atomized or ground powders) having a poor purity and is 2 to 5 times less than that of the other commercial iron powders having a comparable purity.

What I claim is:

1. A method for the manufacture of metallic powders in a high state of purity well fitted for making metallic articles by cold compression and capable of being sintered rapidly at a comparatively low temperature, comprising the steps of dissolving in an acid at least one metal which it is desired to obtain in powder condition, separating the solution of metal salt from the residue, mixing the solution of metal salt with a solution of ammonium carbonate while bubbling carbon dioxide through the mixture to saturate it and precipitate carbonate of the metal and form a solution of an ammonium salt of the acid, separating the precipitated carbonate of the metal, heating the precipitated carbonate of the metal while sheltered from air to decompose it into oxide of the metal and carbonic gas, and heating the oxide of the metal in a reducing atmosphere at a temperature of at least 500° C. to reduce the oxide of the metal to metal.

2. A method according to claim 1, wherein the reducing atmosphere is an atmosphere of hydrogen.

3. A method for the manufacture of iron powders in a high state of purity well fitted for making articles by cold compression and capable of being sintered rapidly at a comparatively low temperature, comprising the steps of dissolving iron in an acid, separating the solution of iron salt from the residue, mixing the solution of iron salt with a solution of ammonium carbonate while bubbling carbon dioxide through the mixture to saturate it and precipitate iron carbonate and form a solution of an ammonium salt of the acid, separating the precipitated iron carbonate, heating the precipitated iron carbonate while sheltered from air to decompose it into iron oxide and carbonic gas, and heating the iron oxide in a reducing atmosphere at a temperature of at least 500° C. to reduce the iron oxide to iron.

4. A method for the manufacture of iron powders in a state of high purity well fitted for making articles by cold compression and capable of being sintered rapidly at a comparatively low temperature, comprising the steps of dissolving iron in sulphuric acid, separating the solution of iron sulphate from the residue, mixing the solution of iron sulphate with a solution of ammonium carbonate while bubbling carbon dioxide through the mixture to saturate it and precipitate iron carbonate and form a solution of ammonium sulphate, separating the precipitated iron carbonate, heating the precipitated iron carbonate while sheltered from air to decompose it into iron oxide and carbonic gas, and heating the iron oxide in an atmosphere of hydrogen at a temperature of at least 500° C. to reduce the iron oxide to iron.

CHARLES MARQUAIRE.

References Cited in the file of this patent

UNITED STATES PATENTS

| Number | Name | Date |
|---|---|---|
| 802,928 | Fireman | Oct. 24, 1905 |
| 997,237 | Carrick | July 4, 1911 |
| 2,254,976 | Powell | Sept. 2, 1941 |
| 2,441,770 | Kroll | May 18, 1948 |

OTHER REFERENCES

Treatise on Powder Metallurgy, vol. I, page 172. Edited by Goetzel. Published in 1949 by Interscience Publishers, New York.